Oct. 31, 1939.  W. I. SENGER ET AL  2,178,439
TRANSMISSION AND CONTROL MECHANISM
Filed June 3, 1936   9 Sheets-Sheet 1

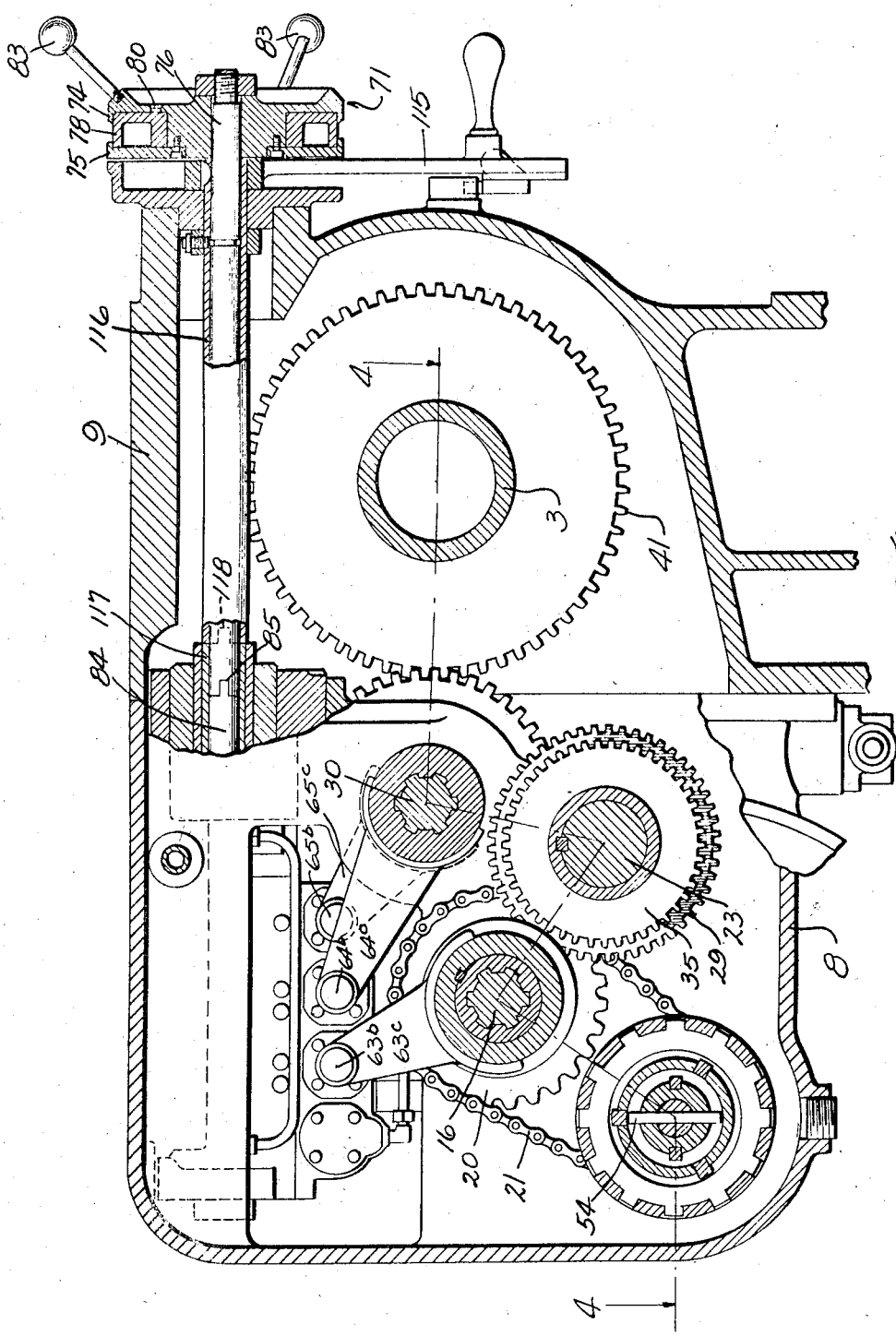

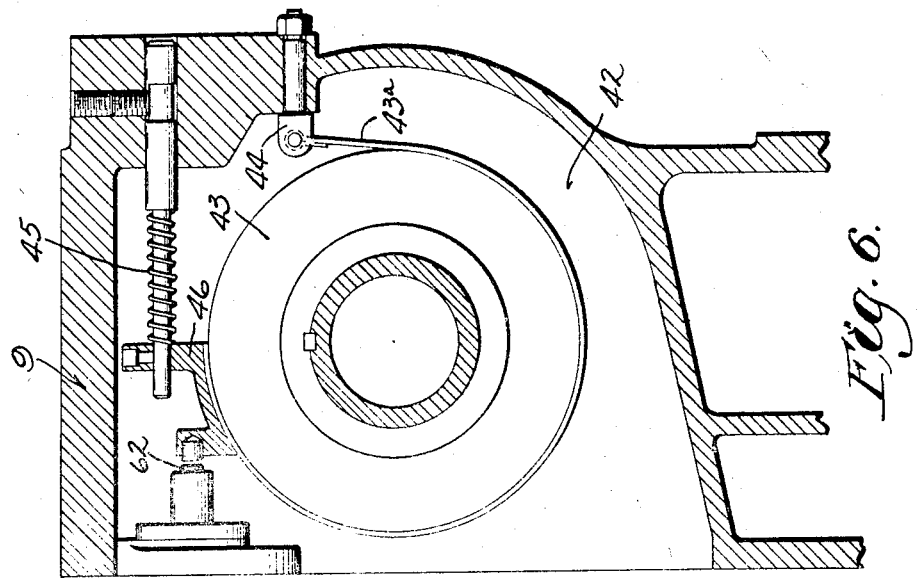
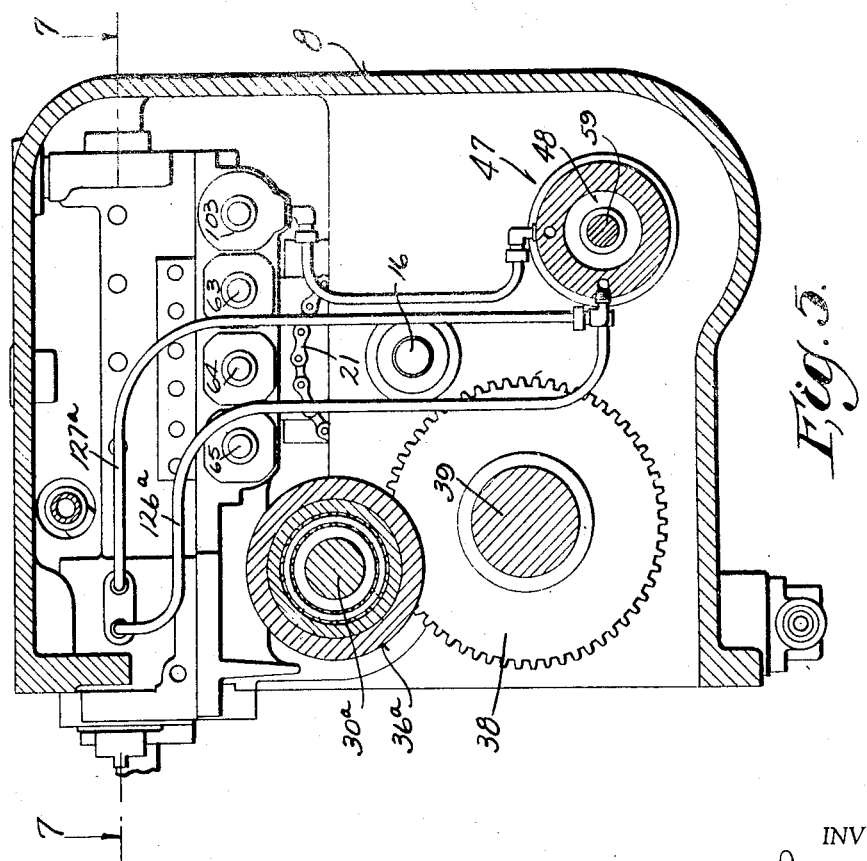

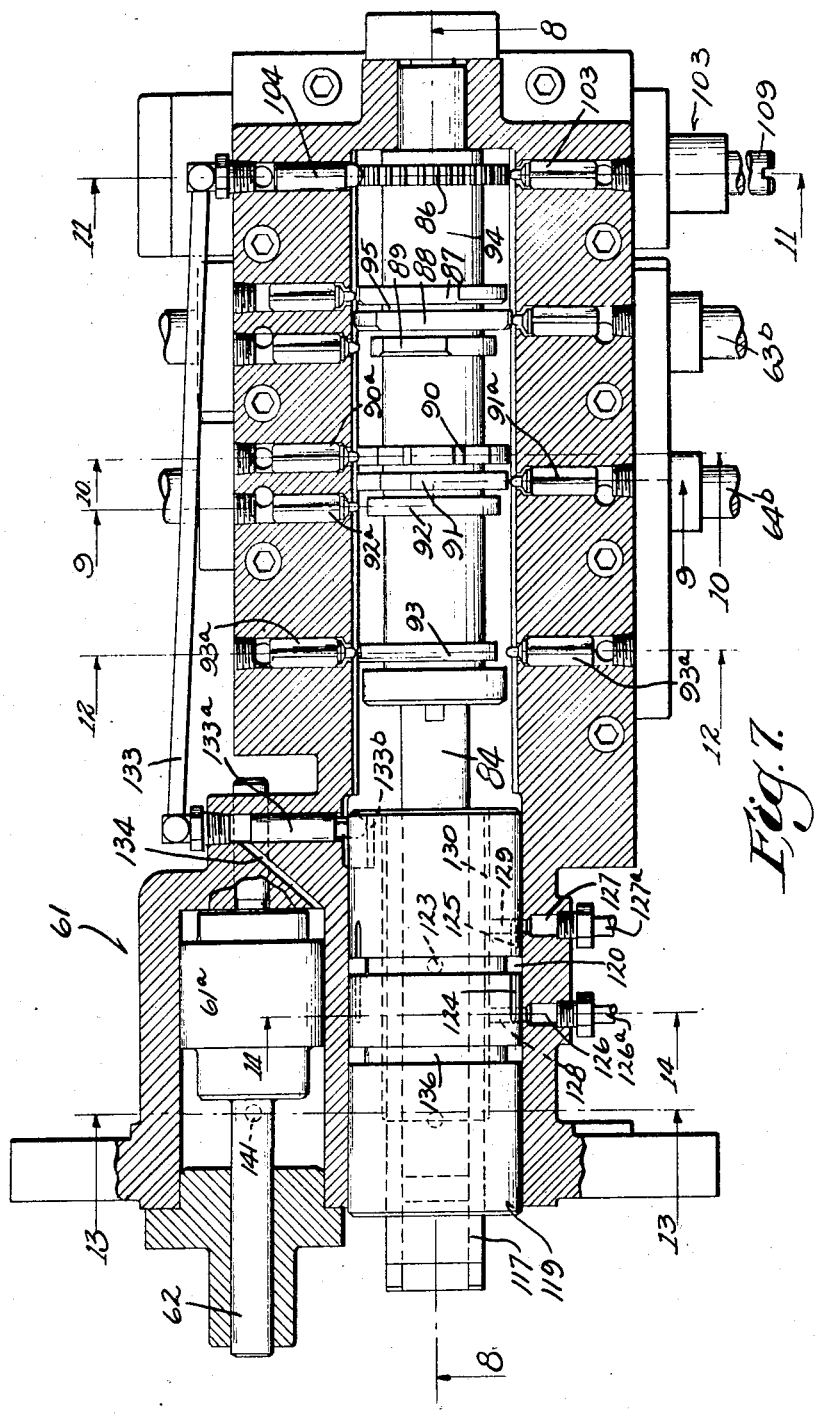

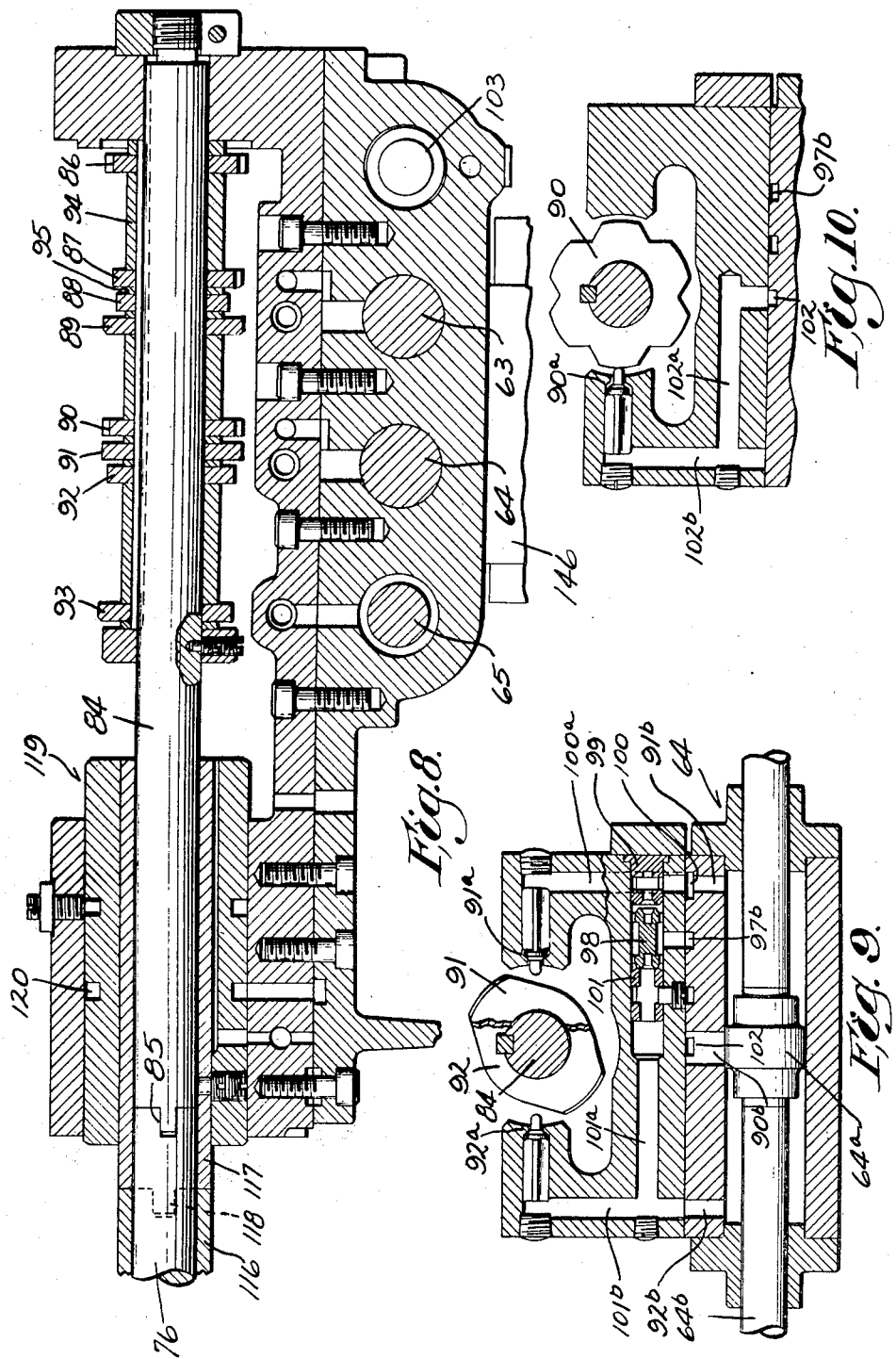

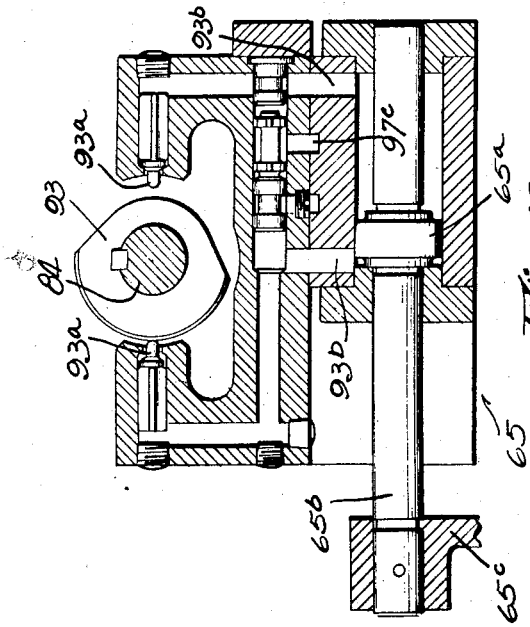
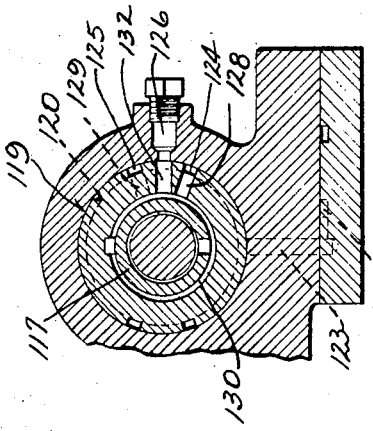
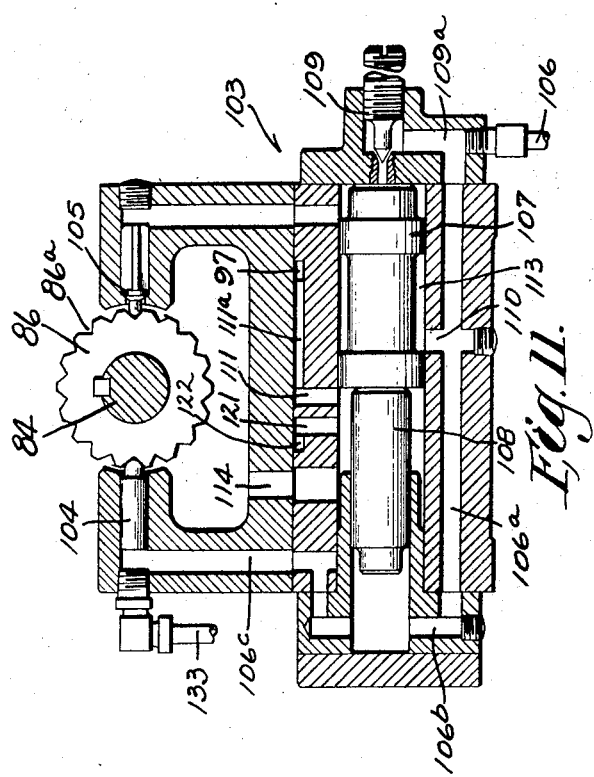
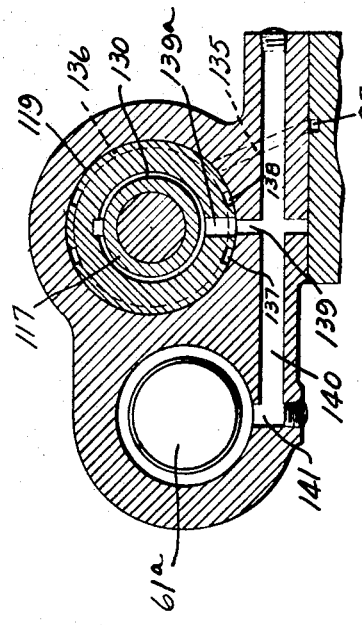

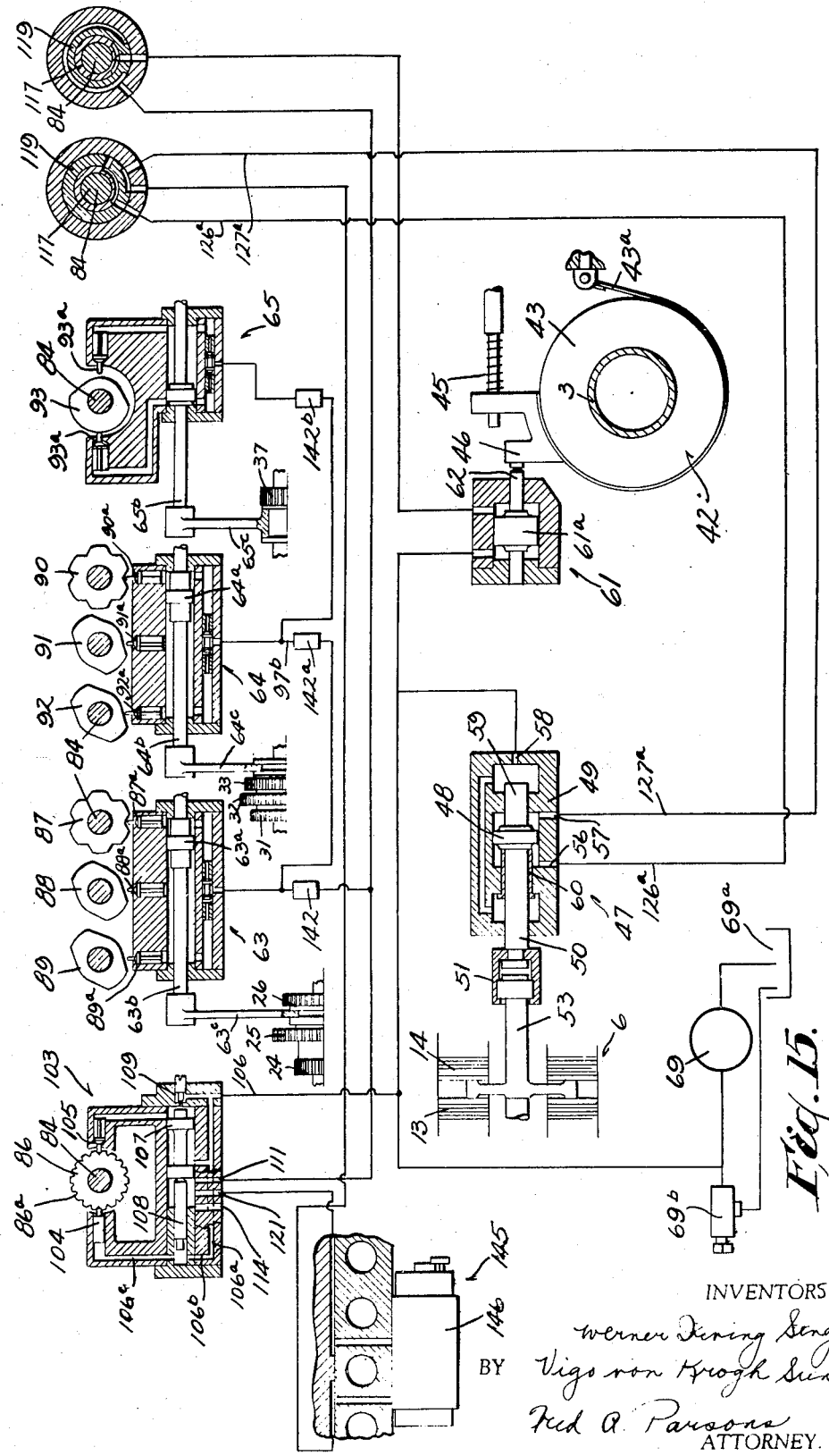

Patented Oct. 31, 1939

2,178,439

UNITED STATES PATENT OFFICE 2,178,439

TRANSMISSION AND CONTROL MECHANISM

Werner Irving Senger and Vigo von Krogh Sundt, Madison, Wis., assignors to Gisholt Machine Company, Madison, Wis.

Application June 3, 1936, Serial No. 83,306

21 Claims. (Cl. 82—29)

This invention relates to transmission and control mechanism for machine tools, etc., and more particularly for the spindle transmission of a lathe.

A purpose of the invention is to provide an improved mechanism, for a mechanical transmission having alternative driving or interrupting means, which will effect a period of less than full driving capacity of the driving-interrupting means during engagement thereof, as for instance to avoid shock upon starting or reversing a spindle transmission in a machine tool, or to assist the engagement of sliding gears or clutches of a spindle transmission.

A further purpose of the invention is to provide improved and more conveniently operated mechanism for controlling of various elements of a transmission, as for instance a rate changer, a clutch or reverser, and a brake.

A further purpose is to provide an improved transmission mechanism in which rate changes and other control operations may be effected by power.

A further purpose is to provide an improved interlocking or inter-related operation of power operated shifting devices for controlling transmission effects of various sorts, as for instance rate change, interruption, reversal and braking.

A further purpose is to effect an improved control for a transmission having a rate changer and other adjustable control devices, as for instance, a reverser, a brake or an interruptor, in which for the purpose of effecting a rate change there is an inter-related operation of the rate changer and one or more of the other devices, but for other control purposes there is an independent operation of some of the other devices.

A further purpose is to effect an improved rate change device in which, as an incident to rate changing, the power transmission to the rate changer is automatically interrupted before adjusting the rate changer, and automatically connected again following completion of the rate change.

A further purpose is to provide an improved control mechanism for a rate changer having a reversible driving connection, in which the driving connection is interrupted prior to the shifting of the rate changer, and is connected, following the rate change, to drive the rate changer in the same direction as before.

A further purpose is to provide an improved shifting device for a rate changer having a serial arrangement of shiftable rate change elements or groups of elements, in which the shifting of the required elements to change from any available rate to any other available rate will invariably proceed in a sequence such that the elements or groups will be shifted one at a time in a preferred order.

A further purpose is to provide an improved device for control of a rate changer productive of a relatively large number of different rates, in a manner such that selection of a desired rate may be instantly made irrespective of the preceding rate and the shifting to effect the selected rate will be selectively performed without effecting position combinations productive of other rates.

A further purpose is to improve and simplify the mechanism of the co-pending application Serial No. 24,201, filed May 31, 1935, in a machine operative for similar purposes. In part the improvements here shown reside in improved operation, in part in an improved structure of the parts and the relationship thereof and in part in improved simplicity and convenience of manufacture, assembly and operation.

A further purpose is generally to simplify and improve the construction, operation and relationship of transmission and control mechanism of a machine tool, particularly when the transmission includes reverser or interrupter devices, a brake device and a rate change device; and still other objects will be apparent from this specification.

The invention consists in the construction and arrangement of parts as herein illustrated, described and claimed, and in such modifications thereof as are equivalent to the structure claimed.

Throughout the specification the same reference characters have been used to indicate the same parts, and in the drawings:

Figure 3 is a vertical section, taken approximately along the line 3—3 of Fig. 1 and enlarged.

Figure 5 is an enlarged vertical section through a rear portion of the transmission control, taken approximately along line 5—5 of Fig. 1 and more exactly along line 5,5 of Fig. 4.

Figure 6 is an enlarged vertical section showing a spindle brake, taken approximately along line 6—6 of Fig. 1.

Figure 7 is an enlarged horizontal section of a controller unit taken approximately along line 7—7 of Fig. 5.

Figure 8 is a vertical section of the same controller unit and associated structure, taken approximately along line 8—8 of Fig. 7.

Figures 9, 10, 11, 12, 13, 14 are vertical sections of the same controller unit, taken respectively along lines 9—9, 10—10, 11—11, 12—12, 13—13 and 14—14 of Fig. 7.

Figure 15 is a more or less diagrammatic view showing certain control mechanism of the machine and certain interconnections thereof.

Figure 2:
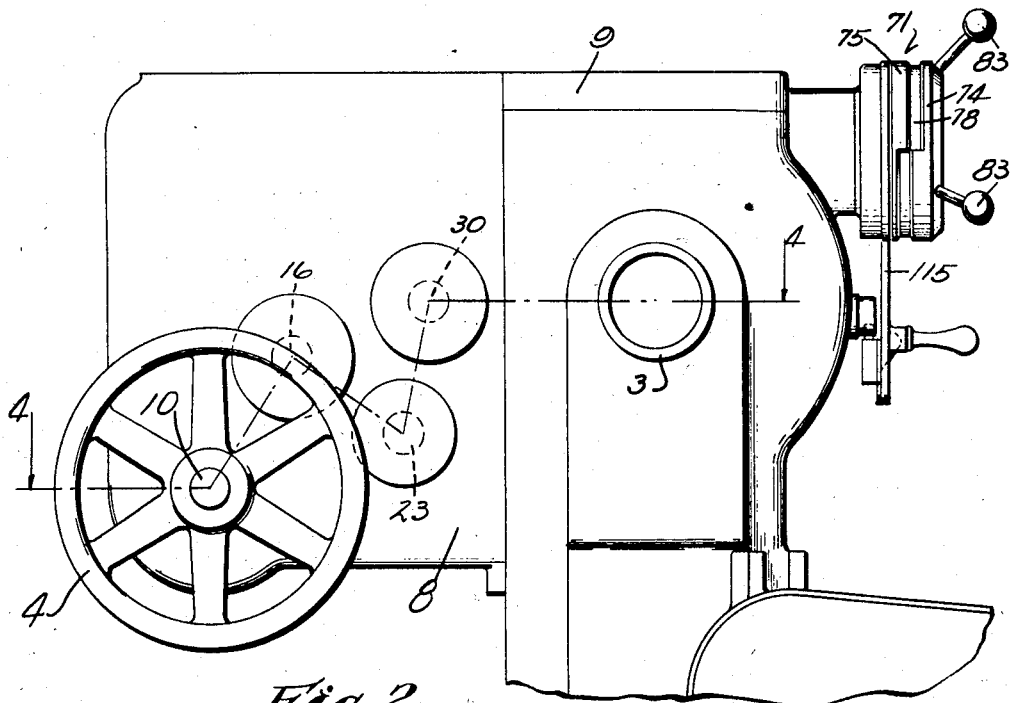
Figure 2 is a left end elevation of the same structure.
Figure 1:
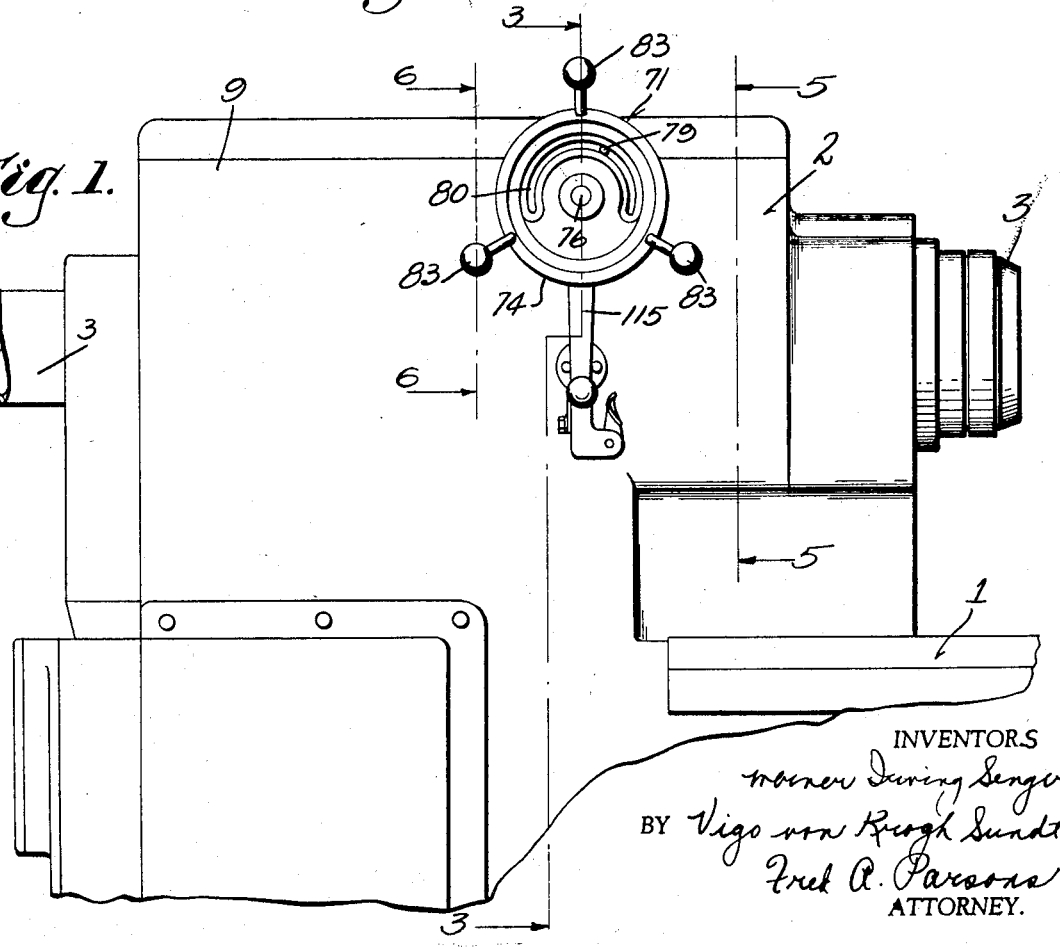
Figure 1 shows a front view of a headstock and spindle drive portion of a lathe in which the invention is incorporated.
Figure 4:
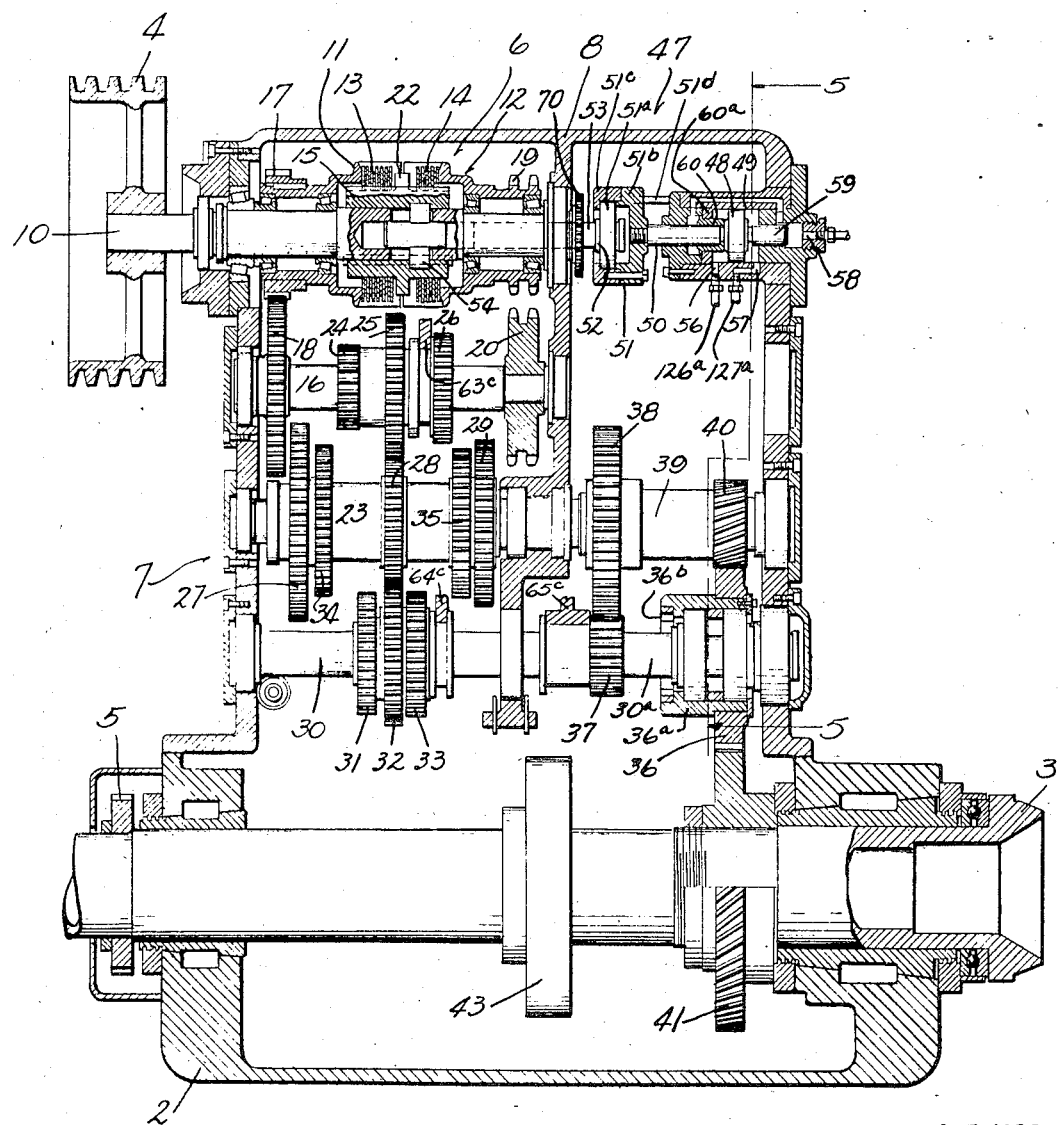
Figure 4 is a sectional development of the transmission for the spindle of the lathe shown in Fig. 1, taken approximately along the line 4—4 of Fig. 3, and also of Fig. 2.

The machine of the drawings is a lathe, which includes a bed, a portion of which is shown at 1, Fig. 1, upon which a headstock, generally denoted by the numeral 2, is mounted. A spindle 3, Figs. 1, 4, is driven from a power source associated with the machine, in this case a drive pulley 4. The lathe has suitable tool supports, not shown, driven through a feed train which may be any of several well known types driven from the spindle 3 through a feed gear such as 5, Fig. 4. Spindle transmission mechanism is provided for driving spindle 3 from pulley 4 at a variety of rotational speeds, the transmission being of improved form and arrangement as more particularly pointed out in a co-pending application, Serial No. 117,305, filed December 23, 1936. The spindle transmission includes the pulley 4, a reverser-interruptor generally denoted by the numeral 6, Fig. 4, and a rate change device generally denoted by the numeral 7, the pulley, reverser, rate changer and certain other mechanism being unitarily carried by a removable housing member 8, Figs. 2, 4, which is rigidly fixed with an upstanding housing portion 9 carried by bed 1, in which spindle 3 is rotatably mounted, as more particularly described in said co-pending application Serial No. 117,305.

The reverser-interrupter 6 is of the following construction: Pulley 4, Fig. 4, is fixed on a shaft 10 which carries a plurality of outer clutch members 11, 12 each independently rotatable and respectively keyed with the alternate driven plates of different friction plate groups 13, 14 of different driving clutches each having alternate driving plates keyed to an inner member 15 which is slidably keyed on shaft 10. The member 11 drives a shaft 16 through meshed gears 17, 18. Member 12 drives shaft 16 through double sprockets 19, 20, the sprockets being connected by drive chains such as 21, Fig. 3. The inner member 15 provides an annular abutment portion 22, and is axially shiftable to alternatively cause frictional engagement between the plates of group 13, or oppositely to cause engagement of the plates of group 14, and the arrangement is such that as member 15 is shifted in opposite directions the shaft 16 is driven in forward and reverse directions.

The spindle rate changer 7 is constructed as follows: A shaft 23, Fig. 4, is driven from shaft 16 through a rate change device which includes the gears 24, 25, 26 fixed together and slidably keyed on shaft 16 and respectively engageable one at a time with gears 27, 28, 29 which are fixed on shaft 23. A shaft 30 is driven from shaft 23 through a rate change device which includes the gears 31, 32, 33 fixed together and slidably keyed on shaft 30 and respectively engageable one at a time with a gear 34, the gear 28 and another gear 35, each of the gears 34 and 35 being also fixed on shaft 23. A gear 36 is fixed on a sleeve 36a which is rotatably supported on the extended end 30a of shaft 30, sleeve 36a and gear 36 being driven from shaft 30 through a rate change device which includes a clutch gear 37 shiftable to engage internal clutch elements 36b on sleeve 36a, in which case gear 36 is driven at the same speed as the shaft 30, or to engage gear 38 of a reduction train consisting of gear 38, a shaft 39 co-axial with the shaft 23, and a gear 40 which meshes with gear 36, in which case gear 36 is driven at relatively slow speed. The gear 36 drives spindle 3 and feed gear 5 through a meshed gear 41 fixed on the spindle, and the several rate change devices and the reverser provide for eighteen changes of rotational spindle speed, substantially in a geometrical progression, and in either direction.

A spindle brake device generally denoted by the numeral 42, Fig. 6, includes a brake drum or friction wheel 43, Figs. 4, 6, a friction band 43a anchored at the one end with a stud 44 and normally urged toward released position by a spring 45 acting on an abutment member 46 which is fixed to the band.

The reverser 6, the various rate change units, and brake 42 are provided with means for this power operation including fluid operable piston devices as follows:

A reverser piston device for reverser 6, generally denoted by the numeral 47, Figs. 4, 15, includes a fluid operable piston 48, a cylinder 49, and a piston rod 50 provided with a coupling unit 51 which engages the enlarged end 52 of a shifter rod 53 slidable in an axial bore of the shaft 10, rod 53 being extended to carry a shifter member 54, Fig. 4, which extends radially outwardly through suitable slots in the shaft 10 to engage at its ends with the slidably keyed reverser clutch member 15, whereby, as piston 48 is shifted, the abutment portion 22 of the member 15 is correspondingly shifted to operate the reverser 6. The coupling unit 51 includes a thrust bearing 51a and suitable thrust plates 51b, 51c fixed on piston 50 and engaging the outer race, there being suitable means, as rod 51d preventing rotation of the thrust plates.

The piston 48 of reverser piston device 47 may be alternatively operated in the one or the other direction, whereby to engage the reverser 6 for forward or reverse rotation, by fluid pressure from suitable ports 56, 57, Fig. 4. Fluid pressure is continuously supplied to piston device 47 from a port 58 which continuously tends to shift reverser 6 to its central or non-engaged position, the pressure from port 58 acting at the one end of the device against an extended portion 59 of piston rod 50, and at the other end of the device against a shouldered sleeve 60. Whenever fluid pressure is applied through either port 56, 57 the piston 48 and rod 10 are shifted against the resistance of the fluid pressure from port 58 by reason of the relatively large area of piston 48, but when pressure is released from both ports 56, 57 the piston device 47 and reverser 6 will immediately be shifted to central non-driving position, the fluid from port 58 then simultaneously forcing the sleeve 60 to the right against a shouldered position 63a, and forcing the piston rod to the left until the piston rests against the end of sleeve 60.

A spindle brake piston device, generally denoted by the numeral 61, Figs. 7, 15, includes a piston 61a, having a rod 62, Figs. 6, 7. Piston 61a may be forced to the left in Fig. 7, as will be later explained, to overcome spring 45 and engage brake 42, or may be forced in the other direction to permit spring 45 to release the brake.

For the speed change device comprising the shiftable gears 24, 25, 26, Figs. 4, 15, there is provided a shifter including a piston device generally denoted by the numeral 63, Figs. 8, 15, which includes a piston 63a, upon the piston rod 63b of which is fixed a shifter arm 63c engaging a suitable annular groove in the gear unit.

For the speed change device comprising the shiftable gears 31, 32, 33, Figs. 4, 15, there is provided a shifter including a piston device generally denoted by the numeral 64, Figs. 8, 9, 15, which includes a piston 64a, upon the piston rod 64b of which is fixed a shifter arm 64c engaging a suitable annular groove in the gear unit.

For the speed change device comprising the shiftable clutch gear 37, Figs. 4, 15, there is provided a shifter including a piston device generally denoted by the numeral 65, Figs. 8, 12, 15, which includes a piston 65a upon the piston rod 65b of which is fixed shifter arm 65c engaging a suitable annular groove in the hub of the gear.

For the operation of the several piston devices a pressure fluid source, such as a pump of any suitable type, as indicated at 69, Fig. 15, is driven whenever pulley 4 is running, as for instance by a gear 70, Fig. 4, fixed on shaft 10, the pump drawing oil from a sump 69a, diagrammatically shown in Fig. 15 which may, for instance, be formed by the lower portion of the spindle gear housing. Excess oil and waste from operation of the shifters is used to lubricate the transmission. The pressure of the fluid for the several piston devices is maintained constant by providing pump 69 with excess capacity, and by providing a constant pressure relief valve 69b, Fig. 15, of suitable type. Excess fluid from valve 69b may be distributed through lubricating channels (not shown) and returned to the sump.

Figure 16:
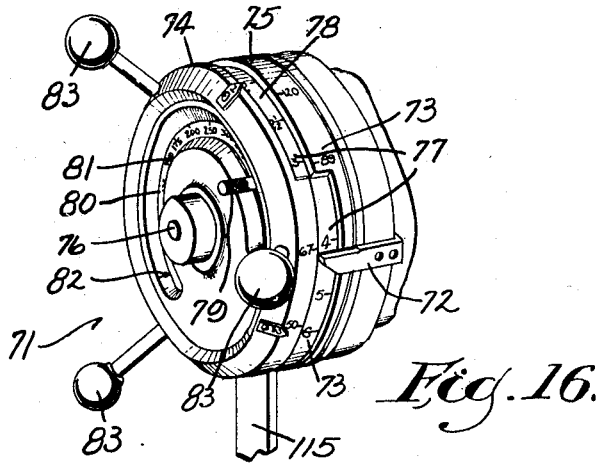
Figure 16 is a perspective view of a speed change controller.

Control means for the operation of the various piston devices is provided as follows:

A speed selector device, generally indicated by the numeral 71, Figs. 3, 16 is similar to that shown in a co-pending application, Serial No. 58,549, filed January 10, 1936, which will therefore, here be only briefly described. The selector device includes a fixed indicator pointer 72 against which a plurality of charts or scales are readable. One of the charts includes numerals such as 73 arranged on the exposed peripheries of flange members 74, 75 which are both fixed for rotation with a shaft 76. The numerals 73 are arranged in consecutive order and correspond with the rotative speeds available for spindle 3 upon operation of the several rate change devices to their various position combinations. Another chart readable against indicator 72 includes numerals such as 77 arranged on the periphery of an annular member 78 which is frictionally held to be normally rotatable with the flange members 74, 75, but is adjustable relative thereto by the means of a handle 79 which projects through a slot 80 in the member 75. The numerals 77 indicate different work diameters within the speed range of the machine and arranged in consecutive order.

Still another chart includes numerals such as 81, arranged in consecutive order on the face of the member 78 to be visible through slot 80 and readable against an indicator pointer or arrow 82 which is rotatable with shaft 76. The numerals of the last mentioned chart are arranged to indicate surface or peripheral speed on the work piece rotating with the spindle.

As illustrative of the use of the speed selector device there is selected on the chart 81 a desired peripheral speed suitable for the turning tool used and for the work material to be operated upon, the member 78 being turned by lever 79 until that peripheral speed is indicated against the pointer 82. Shaft 76 is then turned in either direction by the means of handles such as 83 until the diameter of the work piece as listed on the chart 77 is indicated against the pointer 72. If this does not exactly correspond to an available rotational speed, as indicated on chart 73 then choice must be made of a slightly higher or lower rotational speed, the rotative speed thus selected being aligned with pointer 72, whereupon the shifter devices, later described, will shift the rate change devices to effect the desired speed.

The positioning of the selector device, as described effects the selected speed by the means of mechanism as follows:

Shaft 76, Fig. 3, is coupled for rotation with a co-axial shaft 84, Figs. 7, 8 by the means of an axially disengageable tongue and slot coupling indicated at 85, Fig. 8. Fixed on shaft 84 are a plurality of cam members 86, 87, 88, 89, 90, 91, 92, 93, Figs. 8, 15 separated by spacers such as 94, 95, to operate various poppet valves which control the shifting of the piston devices to effect rate changing.

Thus, for controlling the movement of the piston device 63 the cams 87, 88, 89, Figs. 8, 15 respectively operate the poppet valves 87a, 88a, 89a. For piston device 64 the cams 90, 91, 92 operate poppet valves 90a, 91a, 92a and for piston device 65 the cam 93 operates both the poppet valves 93a, 93a. In each instance the configuration of the cams is such that as shaft 84 is rotated one only of the poppet valves of each piston device is opened by the cams in each angular position of the shaft 84 corresponding to the points where the different rotative speed indicating chart numerals 73 read against the indicator pointer 72. In each such positions the cams are cut away to permit the fluid pressure to close the other valves of the set against their seats. It will be understood that in the drawings the cams are more or less diagrammatically shown, but it will be obvious that in each device the cams may be formed to operate as just described.

The different poppet valves of the piston devices 63, 64, 65 each communicate with a different port of the associated piston device, the ports being spaced in the direction of piston movement according to the different piston positions required. Opening the poppet valve results in movement of the piston of the device to a position corresponding to the port leading to the open valve, whereby to shift the speed change units to the indicated speed position. As illustrative of this action the operation of the piston device 64 is as follows:

Referring to Figs. 9, 10, the piston device 64 has ports 90b, 91b, 92b respectively controlled by poppet valves 90a, 91a, 92a through suitable channels. In each instance opening the poppet valve will provide a fluid drain for the port. The ports are spaced in accordance with the three positions required for the piston 64a. Fluid is supplied to the piston device through a channel groove 97b and a valve member 98 which may move axially in either direction. In the one direction of movement valve 98 seats against a member 99 to prevent flow of fluid from channel 97b to a groove 100 which communicates directly with port 91b, and with the poppet valve 91a through a channel 100a. In the other direction of movement valve 98 seats against a member 101 to prevent flow of fluid to the port 92b and to poppet valve 92a through the channels 101a, 101b. Thus if either poppet valve 91a or 92a is opened the resulting reduction of pressure moves valve 98 in the direction of the opened poppet valve, and holds it in position closing the flow of fluid from supply channel 97b to the open valve. This leaves the one end of piston 64a connected to the pressure supply, and the other connected to the open poppet valve. The piston will therefore move in the direction of the open valve, thereby shifting the associated gear unit. Port 90b communicates with poppet valve 90a through a groove 102, Figs. 9, 10, and channels 102a, 102b, and, similarly to the operation just described, the opening of poppet valve 90b when piston 64a is in either extreme position, relieves the pressure on one end of the piston, whereupon the pressure on the other end moves the piston until the piston covers the port 90b leading to the open poppet valve.

The spacing of the ports 90b, 91b, 92b is such that, accordingly as the one or the other of the poppet valves is opened the piston 64a will move to three positions, corresponding to the three speed productive positions of the gears 31, 32, 33, accordingly as the cams 90, 91, 92 open the one or the other of the poppet valves 90a, 91a, 92a.

The piston device 63 is constructed similarly to the device 64, just described and is similarly moved to three positions, corresponding to the three positions of gears 24, 25, 26, accordingly as cams 87, 88, 89 open poppet valves 87a, 88a, 89a. Since the connection and operation is substantially the same as the device 64 it will not be described in detail.

The piston device 65, Figs. 12, 15 is also similarly controlled for movement to the two positions of the clutch gear 37 by the means of fluid supplied from a channel 97c, accordingly as cam 93 opens the one or the other poppet valve 93a, 93a, but in this instance, the piston 65a having only two positions, only two ports are required, as shown at 93b, 93b, Figs. 12, 15.

The various poppet valve cams associated with piston devices 63, 64, 65 are so configurated and positioned that as shaft 84 is rotated the various piston devices and speed change elements are moved to different position combinations resulting in speeds arranged in numerical order, and at points in the rotation of the shaft corresponding to the position of the rotation chart numerals 77 as they are successively readable against indicator 72. This results also in the arrangement of the numerals of the other charts in numerical order, the spacing thereof being determined by the spacing of the numerals on the rotation chart.

Means are provided to prevent the shifters from starting to move as the selector shaft 84 is rotated to pass through one or more positions corresponding to undesired speeds. To effect this result and other results later mentioned there is provided a delay device, generally denoted by the numeral 103, Figs. 11, 15. The cam 86, Figs. 8, 11, 15 is provided with notches such as 86a, corresponding in number and position to the speed positions of selector shaft 84. The notches 86a are normally engaged by a fluid pressed detent plunger 104, yieldably holding the cam and shaft in the various speed positions, both to mark the speed position for the operator, and to locate the cam relative to a poppet valve 105, the plunger 104 being continuously supplied with fluid from source 69, as by a pipe channel 106, and communicating channels 106a, 106b, 106c.

The delay device 103 includes a piston plunger 107 and a piston plunger 108 of relatively smaller area. The left end, Fig. 11, of piston 108 is continuously supplied with fluid through the channels 106, 106a. The right end of piston 107, Fig. 11, is supplied with fluid from channel 106 through an adjustable needle valve device 109 and a channel 109a. The pressure acting on the right hand end of piston 107 normally forces both pistons 107 and 108 to the left in Fig. 11, to a position where a port 110, which is continuously supplied from channel 106a, communicates with an outlet port 111, through an annular groove 113 in piston 107. The port 111 is connected to a channel 97 through a groove 111a to supply fluid to the shifter devices 63, 64, 65 as later described, but when the poppet valve 105 is opened by cam 86 during rotation of selector shaft 84 to effect a change in speed, the fluid pressure on piston 107 is immediately relieved and piston 108 forces piston 107 to the right, to the position shown in Fig. 11, and in this position the supply port 110 is cut off from port 111, and port 111 and channel 97 are connected to a drain channel 114. Piston 107 will almost immediately again move to the left to close the drain and again supply fluid to port 111 and channel 97, but only after needle valve 109 has permitted sufficient fluid to move the piston to flow therethrough. The interval of delay may be varied by adjustment of the needle valve 109, but is sufficient that in rotating shaft 84 at normal adjustment speed no pressure will be available in channel 97 for operation of the piston devices 63, 64, 65 until the selector shaft comes to rest in a desired speed position.

The reverser piston device 47, Figs. 4, 5, 15 may be controlled to shift reverser 6 into the one or the other direction position by the means of a hand lever 115, Figs. 3, 16, fixed on a sleeve 116, Figs. 3, 8, which is co-axial with shafts 76, 84 and coupled with a co-axial sleeve 117, Fig. 8, by the means of a tongue and slot coupling connection 118. Fixed on sleeve 117 is a rotary valve member 119, Figs. 7, 8 having an annular fluid channel 120, Figs. 8, 14, which is supplied with fluid from the delay device 103, Fig. 11, through an outlet port 121, a channel groove 122, Fig. 11, a channel groove 122a, Fig. 14, and channel 123, Figs. 7, 14. From the annular groove 120 short channel grooves 124, 125, Figs. 7, 14 extend respectively in opposite axial directions to effect communication between the groove 120 and the different ports 126, 127, Fig. 7, respectively as the lever 115 is moved in opposite directions. The ports 126, 127 respectively communicate through pipe channels 126a, 127a, Figs. 5, 7 with the ports 57, 56, Fig. 4, of reverser piston device 47. Simultaneously with movement of lever 115 to bring either port 126, 127, Fig. 7, into communication with the supply channel, the other port is connected to a drain, there being drilled holes 128, 129, Figs. 7, 14, suitably spaced for the purpose and communicating with an interior chamber or annular groove 130 which is extended to the end of the sleeve valve 119 to drain into the interior of the headstock. When hand lever 115 is in central position both the parts 126, 127 are connected to the drain groove 130 there being a plurality of drilled channels such as the channel 132, Fig. 14, for port 126, suitably positioned in the valve sleeve 119 to effect such connection, a similar channel being provided for the port 127.

By reason of the construction of the sleeve valve 119 and the construction of the reverser piston device 47, previously described, it will be apparent that the movement of lever 115 in either direction effects corresponding engagement of the reverser 6, while a central position of the lever 115 effects an intermediate disengaged position of the reverser.

Means are provided to control the reverser 6 from the speed selector device, and which are effective to shift the reverser to a position interrupting the transmission to spindle 3 each time a speed change is effected, and to return the reverser to its previous position, as determined by lever 115, upon completion of the speed change. As previously stated the supply of fluid to effect movement of the reverser is through the port 121, Fig. 11, of delay device 103. Port 121 normally receives fluid from supply port 110, but in the operation of the device during speed change as previously described port 121, as well as port 111, is cut off from supply port 110 and connected to the drain port 114. The result is to connect either active port 56 or 57 of reverser piston device 47, Fig. 4 to the drain, and since the port 58 of the reverser piston device is continuously supplied with fluid, the reverser 6 will be immediately shifted to disengaged position, as previously described, where it will remain until the needle valve 109 has permitted sufficient fluid to pass to again shift piston 107, Fig. 11, to normal position connecting ports 110 and 114. Following this the reverser piston device will again be supplied with pressure fluid to shift reverser 6 to whatever position it previously occupied, unless the connection controlled by lever 115 has been changed during the speed change operation.

The brake 42, Figs. 6, 15, is controlled to be operative from the speed selector device during speed change and to be forced to braking position whenever lever 115 is in the position disengaging reverser clutch 6, as follows: Fluid pressure is continuously supplied to the brake piston 61a, Fig. 7, in a direction to urge the brake to braking position, the fluid supply being derived from pump 69 through port 106, Fig. 11, through the channels 106a, 106b, 106c, pipe connection 133, Figs. 7, 11, and a drilled channel 134, Fig. 7. The braking pressure thus applied may be overcome, whereby to release the brake, by the combined pressure of spring 45, Figs. 6, 15, and fluid pressure applied to the other side of piston 61a, at the left end, Fig. 7. Fluid for the latter purpose is supplied from port 111 of the delay device 103, Fig. 11, through the channel 97, Figs. 11, 13, a channel 135, an annular channel 136 in valve sleeve 119, Figs. 7, 13, and the one or the other of the channel gooves 137, 138, respectively positioned in the valve sleeve 119 for communication with a channel 139 in the different clutch engaged positions of lever 115 and sleeve 119. From channel 139 the pressure fluid reaches piston 61a through channels 140, 141. In the disengaged or central position of reverser control lever 115 the valve sleeve 119 is in position, as shown in Fig. 13, to close the channel 139 against both the supply channels 137, 138, and to open the channel 139 to the drain 130 through a channel 139a in valve sleeve 119 whereby to cause engagement of the brake.

Thus, whenever the reverser 6 is engaged in either direction position the brake 42 is normally disengaged, but upon shifting of the reverser to disengaged position brake 42 engages. Also, since the supply of brake disengaging fluid is through the port 111 of delay device 103, it will result that in each operation of speed changing the brake release supply will be connected to drain port 114, Fig. 11, and the brake will then be engaged temporarily irrespective of the position of the reverser control devices, substantially simultaneously with disengagement of the reverser as previously described. But, as later explained, the brake is disengaged again before the reverser is re-engaged. A fluid operated detent member 133a, Fig. 7, is continuously pressed by fluid from the pipe channel 133 to engage suitable notches such as 133b in the sleeve valve 119, whereby to define the three positions of the sleeve valve.

By reason of the relative positions of the port 111, Fig. 11, which supplies pressure fluid to the shifter devices 63, 64, 65 and also for releasing brake 42, and port 121, which supplies fluid to engage reverser 6, the port 121 is opened to the drain 114, during right hand movement of piston 107, before the port 111. Therefore, during any speed change operation the reverser 6 is disengaged somewhat before the brake 42 is engaged.

Figure 17:
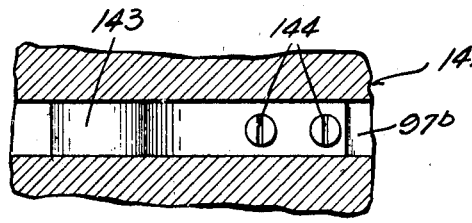
Figures 17, 18 are partial sections showing respectively top and side views of a pressure delay device associated with the rate change piston devices.
Figure 18:
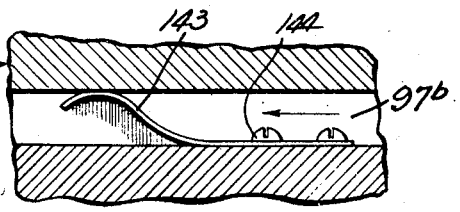

Following connection of port 111, Fig. 11, to the drain 114 during the right hand shifting of piston 107 the brake 42 is immediately engaged, thereby stopping rotation of spindle 3. Following operation of needle valve 109 to again connect port 111 to the supply port 110 the brake 42 is released immediately and before the operation of any of the piston devices 63, 64, 65, there being restricting means operative on each of the piston devices but not on brake releasing means, as follows: Referring to Fig. 15 it will be seen that the fluid pressure from port 111 of the delay device 103 reaches the shifter piston devices 63, 64, 65 only through devices 142, 142a, 142b. These devices are serially arranged for the piston device 63 to receive fluid only through device 142, while piston device 64 receives fluid through both devices 142, 142a, and piston device 65 receives fluid through all three devices 142, 142a, 142b. The several devices 142, 142a, 142b are similar in construction and operation and therefore only the device 142a is shown in detail. Referring to Figs. 17, 18 the device includes a spring member 143 which is fixed by means of screws such as 144 in the channel or supply groove 97b through which fluid reaches the piston devices 64 and 65, the edges of the spring being closely but movably fitted to the sides of the channel groove, and the spring being of such form as to close the channel except as it is sprung by the pressure of the fluid. The springs of each device 142, 142a, 142b are of material resistance, as, for instance 15 or 20 pounds. As will be seen from Fig. 15, the devices 63, 64, 65 will therefore operate in sequence as the pressure from delay device 103 rises; the device 63 operating when the fluid overcomes the first device 142, the device 64 operating when the pressure is twice as high whereby to overcome both the device 142 and 142a, and device 65 operating only when the pressure is sufficient to overcome the three devices 142, 142a, 142b. Since brake 42 receives its pressure for brake release from port 111, Fig. 11, exclusive of devices 142, 142a, 142b, as shown in Fig. 15, the brake will be released during any rate change prior to the operation of either piston device 63, 64, 65.

The fluid for the supply of the reverser piston device 47 is derived through the channel 121 of the delay device 103, Fig. 11, as previously explained. The relative positions of ports 111 and 121 is such that, following a rate change operation, the left hand movement of piston 107 will connect port 111 to the supply port 110 prior to the connection of port 121 for re-engagement of the reverser 6. Brake 42 will, therefore be released prior to the re-engagement of reverser 6.

Figure 19:
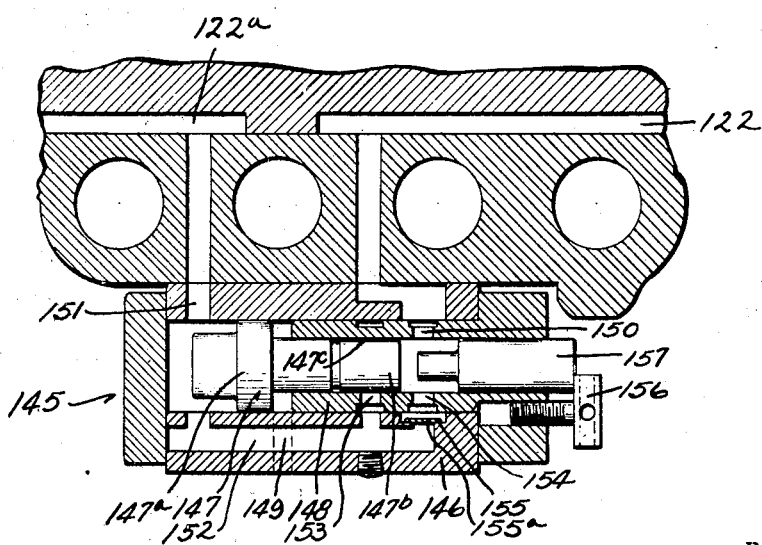
Figure 19 is a vertical section of a control device associated with the spindle reverser.

To further control the reverser engagement, an engagement control device is provided, generally denoted by the numeral 145, Figs. 15, 19. This device is connected serially in the line leading to the reverser piston device 47 from channel 121 of the delay device 103, as indicated in Fig. 15, and therefore controls the operation of the reverser under all conditions whether operated from lever 115 or from the rate selector since, as previously explained, all the fluid for shifting the reverser is derived from the port 121.

Device 145 includes a cylinder member 146, Figs. 8, 15, 19, fixed on the bottom of the housing member for the piston devices 63, 64, 65 and adjacent to the delay device 103. A piston 147, Fig. 19, provides an enlarged portion 147a and a relatively smaller portion 147b, the latter operating in a sleeve 148 fixed in the cylinder bore. The intermediate portion of the piston 147 is exposed to a drain port 149. The smaller area 147b is exposed to the pressure derived from the port 121 and channel 122, Fig. 11 of delay device 103, through a port 150. The larger area 147a is exposed through a port 151 and the channel 122a, Figs. 14, 19 to the pressure in the channel 123, Fig. 14 which supplies the reverser piston device 47 through the rotary control valve 119. A passage 152, Fig. 19, continuously communicates with the port 151 and channel 122a at the one end, and at the other end provides a port 153 which is alternatively covered or uncovered by the small piston end 147b as piston 147 moves to right or left respectively, but even when the piston 147 is to the right some communication exists between the channels 122 and 122a, the small piston end 147b being of slightly reduced diameter at 147c to provide a leakage path past the piston. A port 154 continuously communicates with channel 122 through port 150, and also with channel 122a through port 151, but is prevented from passing fluid from port 150 to port 151 by a one-way valve device 155, which may be of any suitable well known type, in this instance including a flat spring 155a which closes the channel in the direction mentioned but yields to permit substantially free flow of fluid from port 151 to 150.

By reason of the construction of device 145 as just described the reverser piston device 47 will operate to immediately disengage the reverser, as previously described, as a first step in the operation of rate change, the clutch engaging pressure being drained from the supply channel 122a through the one-way valve 155, Fig. 19, port 150, channel 122, and port 121 and drain port 114 of delay device 103, Fig. 11.

The piston 147 of control device 145 normally stands to the right in Fig. 19, being forced to this position by the relatively large area exposed at the left piston end. When the fluid is drained from channels 122, 122a, during rate change, the piston 147 temporarily remains to the right. But as fluid pressure is restored to channel 122, following a rate change, the piston 107 immediately moves to the left, because there is then no pressure on the larger left end. Such initial movement of the piston builds up an initial pressure in the port 151 and channel 122a, but the initial pressure is less than the pressure in channel 122 in the same proportion as the area of end 147b is less than the area of end 147a. The initial pressure for operation of reverser piston device 47 and the reverser 6 is therefore relatively low. The pressure in channel 122a is, however, gradually increased, by leakage through the restricted passage provided by the reduced piston diameter at 147c, until it becomes equal to the pressure in channel 122 and the reverser clutch plates are then exposed to the full operating pressure.

At some intermediate point in the increase of pressure just described, where the pressure on the larger end 147a of piston 147, Fig. 19, overbalances the pressure on the smaller end 147b, the piston 147 again moves to the right to take up its normal operating position. This right hand movement also operates to slow down the equalization of pressures in channels 122, 122a because the right hand movement increases the length of the restricted passageway at 147c and therefore reduces the rate of flow of the pressure equalizing fluid.

For regulation of the period required to build up the pressure in channel 122a, Fig. 19, there is provided a screw 156 which is adjustable to control the position of an abutment piston 157. The piston 157 is forced against screw 156 by fluid pressure, and provides an abutment determining the extent of the right hand movement of piston 147. The farther piston 147 stands to the right, Fig. 19, following movement to the right during the equalization of pressure between passages 122, 122a, the longer the equalizing operation will require.

By reason of the construction described the device 145 has no effect upon the disengagement of the reverser 6, but during engagement of either reverser clutch 13, 14 after interruption the device operates to start the transmission under initially reduced and gradually increasing pressure, thus starting the gears slowly under partial power to assist engagement thereof during a rate change operation and, in any engagement or reversal, operating to avoid shock by gradually overcoming the inertia of the driven train.

The sequence of operations involved in a rate change operation is as follows: Assuming that the lever 115, Fig. 16, is in a position to engage reverser 6, and that the desired new spindle speed is for the same direction of spindle rotation. In such case the only manual operation required is to rotate the selector in either direction by manipulation of the handles 83 of selector 71 until the desired new spindle speed, as listed on chart 73, is in registry with the indicator 72. During such rotation the poppet valve 105 of the delay device 103, Fig. 11, will be opened each time the cam 86 passes through a position intermediate the notches 86a, and as soon as the poppet valve is first opened the piston 107 starts to move to the right, Fig. 11, thereby connecting port 121 to drain 114 whereby to effect a shift of reverser piston device 47 and reverser 6 to intermediate motion interrupting position. Slightly later in the right hand movement of piston 107 of device 103 the port 111 is also opened to the drain 114, thereby immediately effecting a braking position of brake 42 to stop spindle 3. Upon the selector chart arriving at the desired speed position the poppet valve 105 of device 103 remains closed and fluid flows through needle valve 109, Fig. 11, to shift piston 107 to its normal left hand position. During such left hand shift it first occurs that port 111 is opened to pressure fluid, whereupon the spindle brake 42 is immediately released, and as the pressure rises in port 111 the rate change shifter piston devices 63, 64, 65 are subjected to pressure in the order mentioned, the sequence being controlled by the devices 142, 142a, 142b.

The new speed position of the selector device 71 effects a new position combination of the poppet valve cams and poppet valves associated with the piston devices 63, 64, 65, and therefore the rise of pressure in these devices will urge the pistons to effect a corresponding new position combination, but only those pistons will be moved where a poppet valve closed in the previous speed position has been opened in the new speed position.

Very shortly after pressure fluid has been admitted to the port 111, Fig. 11, the continued movement of piston 107 to the left also opens port 121 to pressure fluid, which is applied to the reverser piston device 47 through the control device 145 and the direction control valve 119 to effect engagement of the reverser 6. Since the direction control valve 119 has not been moved during the rate change operation the result is to engage reverser 6 to effect the same spindle direction as before the rate change, but by reason of the operation of the device 145 to initially restrict the fluid pressure to relatively low value, as previously explained, the reverser engagement is without jar or shock.

Following the release of brake 42 in the operation described above the spindle train is free to turn, the slight friction of the disengaged reverser clutch plates will ordinarily turn the train slowly to assist engagement of the various gears to be shifted during a rate change, but in any event the gears will start to turn as soon as the reverser starts to engage, and during the interval while device 145 is effecting the building up of the reverser pressure the gears will rotate slowly to insure meshing of the engaging gears.

It is to be noted that the construction and control of reverser-interruptor 6 is such that the device acts as an overload device limiting the power applied to the spindle and feed trains, and productive of various other useful results. Certain features thereof are more particularly pointed out in a co-pending application Serial No. 130,273, filed March 11, 1937, and all rights to the structure there claimed are specifically reserved, as well as to certain other features shown or described in this application, but claimed in one or the other of the several co-pending applications mentioned herein.

What is claimed is:

1. In a machine tool the combination of a transmission train including an impositive clutch movable between driving and motion interrupting positions and a shiftable rate change device driven through said clutch, a plurality of power operable shifters respectively for said clutch and rate change device, a power train connectible with said shifters, control means including means substantially simultaneously connecting said power train for operation of said rate change device shifter and clutch shifter, and means delaying subsequent movement of said clutch to driving position to effect a period of partial clutch engagement.

2. In a machine tool the combination of a transmission train including an impositive clutch movable between driving and motion interrupting positions and a shiftable rate change device driven through said clutch, a plurality of power operable shifters respectively for said clutch and rate change device, a power train connectible with said shifters, control means including means substantially simultaneously connecting said power train for operation of said rate change device shifter and clutch shifter, means delaying subsequent movement of said clutch to driving position, and means adjustable to determine the duration of the period of said delay.

3. In a machine tool having a transmission including a rate changer providing a plurality of shiftable speed change devices serially arranged, the combination of a plurality of power operable shifter devices respectively for the different speed change devices, a rate selector device including a chart having markings indicating various rates corresponding to different position combinations of said speed change devices and an indicator movable relative to said chart, a plurality of resistor devices respectively associated with the different shifter devices to effect different power requirements for operation of the different shifter devices, a power train connectible with said shifter devices through said resistor devices, and control means for the connection of said power train to operate said shifter device in accordance with the relative position of said chart and indicator.

4. In a machine tool having a transmission including a rate changer providing a plurality of shiftable speed change devices serially arranged, the combination of a plurality of fluid operable piston devices respectively connected for the operation of different of said speed change devices, a rate selector device including a chart having markings indicating various rates corresponding to different position combinations of said speed change devices and an indicator movable relative to said chart, a source of hydraulic pressure connectible with said piston devices, valve means operable from said selector device and controlling the connection of said pressure source to operate said piston devices in accordance with the relative positions of said chart and indicator, and a plurality of resistor devices respectively associated with different of said piston devices and collectively effective for operation of the different devices at different pressures.

5. In a machine tool the combination of a transmission including an impositive clutch movable between driving and motion interrupting positions and a plurality of shiftable rate change devices serially arranged, a plurality of power operable shifters respectively for said clutch and for different of said devices, a rate selector including a chart and indicator means movable relative to said chart, a power train connectible for operation of said shifters, control means operative upon relative movement of said chart and indicator means to connect said power train and shifters to shift said clutch to motion interrupting position, control means subsequently operative to connect said power train and shifters to shift said devices in accordance with the relative positions of said chart and indicator means, means later operative to connect said power train and shifters to shift said clutch to driving position, and means operative to provide a substantial period of partial clutch engagement upon operation of said later operative means.

6. In a machine tool the combination of a transmission including an impositive clutch movable between driving and motion interrupting positions, a plurality of shiftable rate change devices serially driven through said clutch, and a brake device having braking and released positions and effective on said rate change devices, a plurality of power operable shifters respectively for said clutch, for different of said rate change devices and for said brake, a rate selector including a chart and indicator means movable relative to said chart, a power train connectible for operation of said shifters, control means operative upon relative movement of said chart and indicator means to substantially simultaneously connect said power train and shifters to move said clutch to motion interrupting position and to engage said brake, dependently operable control means subsequently operative to connect said power train and shifters to effect a position combination of said rate change devices corresponding to the relative position of said chart and indicator and substantially simultaneously shift said brake to released position, control means later dependently operable to connect said power train and shifters to shift said clutch to engaged position, and means operative to effect a substantial period of partial engagement of said clutch upon operation of said later operative means.

7. In a machine tool the combination of a transmission train including clutch means comprising engageable and disengageable friction surfaces, a piston device, a connection from said piston device for alternative engagement and disengagement of said surfaces, a source of pressure fluid, valve means adjustable for connecting said source and piston device to effect said alternative engagement and disengagement, and means operative in the valve connection effecting engagement of said friction surfaces to effect a substantial period of relatively low pressure between said source and piston device.

8. In a machine tool the combination of a transmission train including clutch means comprising engageable and disengageable friction surfaces, a piston device, a connection from said piston device for alternative engagement and disengagement of said surfaces, a source of pressure fluid, valve means adjustable for connecting said source and piston device to effect said alternative engagement and disengagement, means operative to effect a period of relatively low pressure engagement of said friction surfaces following the valve adjustment effecting engagement thereof, and means adjustable for changing the duration of said low pressure period.

9. In a machine tool transmission the combination of clutch means including engageable and disengageable friction surfaces and a rate change device including elements shiftable to a variety of position combinations respectively productive of different speeds, a power train, a first controller operative for effecting a connection of said power train to shift said elements, effect a predetermined position combination thereof and to dependently subsequently engage said friction surfaces, a second controller operable to connect said power train for selective alternative engagement or disengagement of said friction surfaces independently of a shift of said elements, and means operative in the engagement of said friction surfaces from one of said controllers to effect a substantial period of partial engagement thereof.

10. In a machine tool transmission the combination of clutch means including engageable and disengageable friction surfaces and a rate change device including elements shiftable to a variety of position combinations respectively productive of different speeds, a source of pressure fluid, piston devices connectible with said source for alternative engagement or disengagement of said surfaces and for effecting different of said element position combinations, a first control means operative for connection of said source and piston devices to shift said elements to effect a predetermined element position combination and dependently subsequently to engage said friction surfaces, a second controller operative to connect said source and piston devices for selective alternative engagement or disengagement of said friction surfaces independently of a shift of said elements, and control means operative during engagement of said friction surfaces from one of said controllers to effect a substantial period of relatively low pressure engagement of said surfaces.

11. In a machine tool transmission the combination of clutch means including engageable and disengageable friction surfaces and a rate change device including elements shiftable to a variety of position combinations respectively productive of different speeds, a source of pressure fluid, piston devices connectible with said source for alternative engagement or disengagement of said surfaces and for effecting different of said element position combinations, a first control means operative for connection of said source and piston devices to shift said elements to effect a predetermined element position combination and dependently subsequently to engage said friction surfaces, a second controller operative to connect said source and piston devices for selective alternative engagement or disengagement of said friction surfaces independently of a shift of said elements, pressure reducing means associated with said source connection to effect a substantial period of relatively low pressure engagement of said surfaces upon engagement from one of said controllers, and adjusting means controlling the operation of said pressure reducing means to determine the duration of said low pressure period.

12. In a machine tool the combination of transmission mechanism including motion reverser means comprising a plurality of sets of engageable friction surfaces respectively for opposite driving engagement and having a motion interrupting position and a rate changer comprising a plurality of speed change elements shiftable into a variety of different position combinations respectively productive of different speeds, power operable devices respectively connected for shifting said reverser means and for shifting said elements, power means connectible with said power operable devices, a selector movable to a variety of positions respectively corresponding to different of said element position combinations, means operative in each of said positions of said selector to connect the power means with some of said devices to effect the element position combination corresponding to the selector position, means operative upon movement of said selector from one to another of said positions to change the connection of said power means and devices to shift said reverser means from either previous driving engagement position to said interrupting position, means operative subsequent to the shifting of said elements to change the connection of said power means and devices for return of the reverser means to said previous driving engagement position, and means operative during shift of said reverser means to said previous driving engagement to effect a substantial period of engagement of said friction surfaces at relatively low pressure.

13. In a machine tool the combination of transmission mechanism including motion reverser means comprising a plurality of sets of engageable friction surfaces respectively for opposite driving engagement and having a motion interrupting position and a rate changer driven through said reverser and comprising a plurality of speed change elements shiftable into a variety of different position combinations productive respectively of different speeds, a control member movable to a variety of positions respectively corresponding to different position combinations of said elements, connections operative in each of said positions of said control member to effect one of said element position combinations, said connections being operative to effect a different element position combination upon movement of said member from one of said positions to another, connections operative upon said member movement from one to another position to shift said motion reverser means from either previous driving engagement position to interrupting position, connections operative subsequent to said change in element position to return said reverser means to said previous driving engagement position, and means operative during shift of said reverser means to said previous driving engagement to effect a substantial period of engagement of the corresponding set of friction surfaces at relatively low pressure.

14. In a machine tool the combination of a transmission including a plurality of sets of engageable friction surfaces respectively for opposite driving engagement and having a motion interrupting position, a fluid operable shifter, a fluid pressure source, valve means for selective connection of said source and shifter to effect movement of said friction surfaces for either driving engagement or to said motion interrupting position, and means operative upon operation of said control valve means to effect either driving engagement to effect a substantial period of engagement of the corresponding set of friction surfaces at relatively low pressure.

15. In a machine tool the combination of a transmission including a plurality of sets of engageable friction surfaces respectively for opposite driving engagement and having a motion interrupting position, a fluid operable shifter, a fluid pressure source, control valve means for selective connection of said source and shifter to effect movement of said friction surfaces for either driving engagement or to said motion interrupting position, means operative to effect a substantial period of engagement of said friction surfaces at relatively low pressure during engagement thereof for either driving direction, and means adjustable for altering the duration of said period of low pressure engagement.

16. In a machine tool the combination of a transmission including a clutch having friction surfaces alternatively movable to engaged and disengaged positions, a member driven through said clutch and a brake alternatively operative to restrain and release said member, power operable shifter means for said clutch and brake, a power train, control means operative for alternatively connecting said power train and shifter means to substantially simultaneously disengage said friction surfaces and engage said brake or to urge said shifter devices to disengage said brake and subsequently engage said friction surfaces, and control means operative during engagement of said friction surfaces to effect a substantial period of engagement at relatively low pressure.

17. In a machine tool the combination of a transmission comprising a reverser including a plurality of sets of engageable friction surfaces respectively for opposite driving engagement and having a motion interrupting position, a member driven through said reverser, a brake alternatively operable to restrain and to release said member, power operable shifter means for said reverser and brake, a power train, control means operative to connect said power train and shifter means to simultaneously shift said friction surfaces from either engaged position and shift said brake to member restraining position, said control means being alternatively operative to connect said power train and shifters to shift said brake to release said member and to engage the friction surfaces of one of said sets, and means operative during said engagement of the last mentioned set of friction surfaces to effect a substantial period of engagement thereof at relatively low pressure.

18. In a machine tool the combination of a transmission including a clutch comprising friction surfaces operable to engaged and disengaged positions, a fluid operable shifter for said clutch, a pressure fluid source control valve means operable for connection of said source and shifter to effect alternative engaged and disengaged position of said surfaces, and means operable during operation of said surfaces to engaged position to effect an initial engagement thereof at relatively low pressure and to determine duration of a period of increasing pressure.

19. In a transmission and control mechanism the combination of a clutch device including engageable friction members, a fluid operable piston device connected for engagement of said members, a fluid pressure source, channel means connectible between said source and device including controller valve means alternatively adjustable to effect engagement or disengagement of said members, and means operative during member engagement to limit the rate thereof, the last mentioned means being inoperative during disengagement of said members whereby to effect a relatively rapid disengagement thereof.

20. In a transmission and control mechanism the combination of a reverser clutch device including a plurality of sets of friction members alternatively engageable for different direction effects, fluid operable piston means for alternative engagement of the different sets of friction members, a fluid pressure source, channel means connecting said source for operation of said piston means including valve means adjustable for alternative engagement or disengagement of each of said sets of friction members, and engagement rate limiting means operative during the engagement of each of said sets of friction members, said rate limiting means being inoperative during member disengagement whereby to effect relatively rapid disengagement thereof.

21. In a transmission and control mechanism the combination of rate change means including elements shiftable to various position combinations respectively for different rates, driving means for said rate changer including a clutch device comprising engageable friction members, a rate selector adjustable to various positions respectively corresponding to different of said position combinations, means operable in accordance with selector adjustment from one to another of its positions for shifting said elements to a corresponding position combination, a fluid operable piston device connected for engagement of said friction members, a pressure fluid source, channel means connectible between said source and piston device including valve means alternatively adjustable for member engagement or disengagement, means operative from said selector for operation of said valve means to disengage and subsequently to engage said members, and means associated with said channel means to limit the rate of engagement of said members, said rate limiting means being inoperative during member disengagement whereby disengagement occurs at a relatively rapid rate.

WERNER IRVING SENGER.
VIGO von KROGH SUNDT.